Patented Mar. 27, 1951

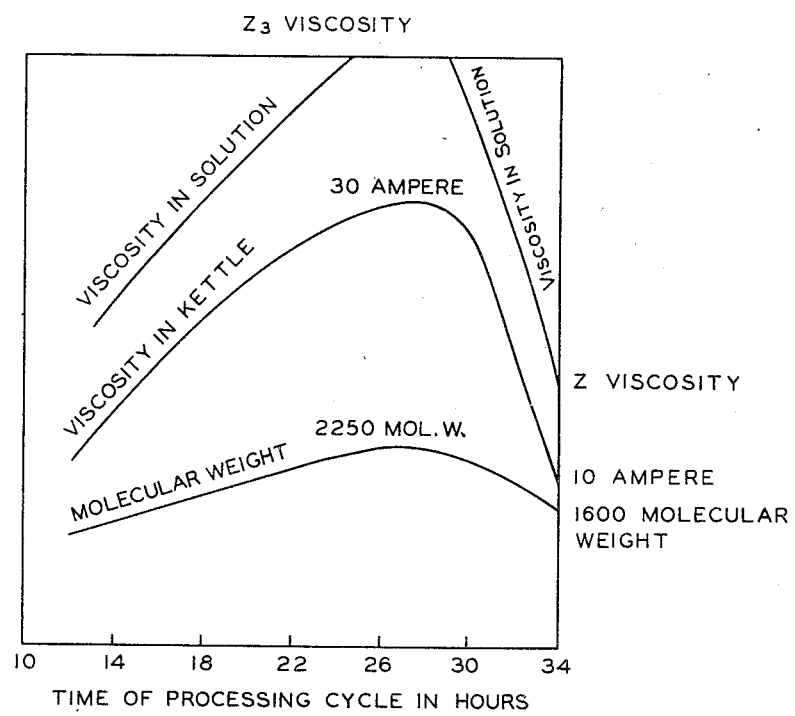

2,546,826

UNITED STATES PATENT OFFICE 2,546,826

DEPOLYMERIZED COPAL-LIKE RESINOUS ESTERS

William Krumbhaar, New York, N. Y.

Application April 20, 1949, Serial No. 88,608

18 Claims. (Cl. 260—59)

This invention relates to synthetic resins, and particularly to synthetic copal-like resinous esters, that is synthetic resins which exhibit the properties of the processed fossil gums, and to methods of producing such copal-like resinous esters as well as their utilization for various purposes.

A consideration of the merits of synthetic resins as compared with natural gums will show the background of the present invention. The technical merits of high melting synthetic resins of the group of modified phenolics, maleics, and hard resinous esters as compared to natural gum copals are fairly obvious. These resins are produced under controlled conditions, yielding uniform standardized properties and fitting detailed specifications and are produced in condition ready for combination with oils.

Natural copals, on the other hand, are formed under a variety of conditions as created by nature, yielding resins of indistinctly defined and fluctuating properties, containing water or aqueous solutions in various degrees of dispersion, and considerable quantities of foreign matter. Gum copals are not ready for direct use in varnish making; for this purpose they have to be rendered oil soluble by the cumbersome process of copal running.

In spite of these obvious drawbacks, the natural gums have retained greater practical importance because certain valuable properties are more pronounced in natural gums after they have been depolymerized than in synthetic resins. For instance, copal ester varnishes have higher viscosity, better bodying and drying properties, greater toughness and durability of the dried film, than rosin ester varnishes, all other conditions being equal. Compared to modified phenolics, copals are reputed to produce glossier varnishes with less tendency to blooming. Copals are also considered to cause better adhesion in varnishes, especially when the latter are baked on metal. When copal varnishes are compared to maleic resin varnishes, it is admitted that their dried films are dark in the beginning, but it is emphasized that they soon bleach out, and it is stressed that copal varnishes under otherwise equal conditions are superior in rubbing and wearing characteristics.

Among the objects of the present invention is the production of a new type of resin or group of resins which unite the advantages of both natural and synthetic resins and eliminate their respective weaknesses.

Further objects include the production of such resins which may be denominated as copal-type synthetic resins because they combine the features of both natural and synthetic resins, particularly desirable features of the fossil gums. The most important copal-like property, as compared to the properties of orthodox synthetic resins of the same melting point and viscosity is the high degree of solubility, molecular homogeneity, mechanical toughness and heat stability.

Still further objects and advantages of the present invention will appear from the more detailed description set forth below, it being understood that this more detailed description is given by way of illustration and explanation only, and not by way of limitation, since various changes therein may be made by those skilled in the art, without departing from the scope and spirit of the present invention.

In accordance with that more detailed description, there is shown in the accompanying drawing, a graph illustrating the change in viscosity and molecular weight during processing of materials in accordance with the present invention.

In accordance with the present invention a new class of resins is produced that may be denominated copal-type or copal-like synthetic resins or resinous esters. Such novel products are produced by carrying out resinification reactions under certain limiting conditions to build up large molecular aggregates which are then followed by molecular degradation or depolymerization under controlled conditions.

These resins are produced by depolymerizing a reversible gel resin of a rosin acid-polyhydric alcohol ester containing free hydroxyl groups, which rosin ester is modified by a phenol-formaldehyde resin. In this invention, there is depolymerized a gelatinizing rosin ester to which the ability of gelling has been imparted. The depolymerization is possible only in the presence of the rosin. The amount of rosin acids is large enough to prevent the formation of an irreversible gel, but it is not so large as to produce non-gelling resins. In this way the amount of rosin acids produces a reversible gel which by way of depolymerization yields the final product desired.

The building up of large molecular aggregates from small units is a familiar process in the manufacture of rosin-modified phenolics, rosin-modified maleics and high molecular rosin esters. If in these resins, either the phenolic or the maleic component exceeds a certain percentage, or if more than a certain amount of copal is incorporated in the rosin esters, the resin starts to gelatinize and usually converts into an infusible and insoluble mass during the course of reaction, which is highly exothermic and difficult to control. The final product cannot be liquefied or solubilized again. Resin gels of such irreversible gel-type are unsuitable for the production of copal-like resinous esters in accordance with the present invention. The resin gels treated in accordance with the present invention are reversible gels, i. e., gelatinous resins, which can be reconverted into fusible and soluble materials by suitable methods. It is true that in certain resin making procedures, which are known in the art, depolymerization inherently or necessarily results. However, this invention uses depolymerization in a systematic and controlled manner by the proper selection of resin forming materials, a special heating and cooling cycle and an especially designed equipment and machinery.

The most important requirement as to chemical composition in the resin gels produced in accordance with the present invention for subsequent treatment, is the presence of free hydroxyl groups. The incorporation of such free hydroxyl groups into the molecule of the resin gels may be accomplished in various ways.

One of the simplest methods of introducing hydroxyl groups consists in using an excess of glycerine during the process of making the resin, which glycerine exerts a pronounced degelling effect by partial alcoholysis. Other higher polybasic alcohols, including mannitol and sorbitol, may be used under proper circumstances to exert a similar effect. The pentaerythritol type alcohols, including the polypentaerythritols, are particularly useful and occupy a special position, because the hydroxy rosin esters of pentaerythritol have the peculiar property of acquiring exceptionally high viscosities before they actually gelatinize.

In this connection, special reference is made to my two U. S. Patents Nos. 2,268,946, entitled Phenol Modified Ethers, patented January 6, 1942, and 2,268,847, entitled Phenol Modified Esters, patented January 6, 1942, and furthermore, to my copending application, Serial No. 588,237, filed April 13, 1945, entitled Polyhydric Polymer, now U. S. Patent 2,434,168.

All three references describe highly successful methods of incorporating free alcoholic hydroxyl groups into synthetic resins.

Another way of introducing alcoholic hydroxyl groups is by the use of solubilized natural copals which have been made soluble by mastication. If masticated natural gums are processed together with acidic rosin products or synthetic resins, they often act very similar to polyhydric alcohols, supplying good evidence that they contain free alcoholic hydroxyl groups. The amount of masticated or soluble copal that can be incorporated depends upon its degree of solubilization and usually does not exceed 25% of the total resin. The process of solubilizing copal gums is described in my three U. S. Patents Nos. 2,007,333, entitled Method of Treating Natural Gums and Product Resulting Therefrom, patented July 9, 1935; 2,101,398, entitled Shellac Substitute and Process of Producing the Same, patented December 7, 1937, and 2,110,803, entitled Resinous Products and Process of Making Same, patented March 8, 1938. Mastication does not utilize heat to make the copals compatible with synthetic resins, but depends on mechanical force to achieve that purpose.

In addition to free hydroxyl groups, the presence of fluxing and peptizing agents is desirable, in order to support the depolymerization process. Materials usable as fluxing agents are illustrated by permanently fusible resins, such as rosin glycerine or pentaerythritol esters, coumarone resin, low melting rosin modified phenolic or maleic resins. These fluxing materials ease the fusion, and at the same time prevent local overheating and charring during the gelling and degelling cycle. They also may enter the process chemically, forming mixed esters by interchange reactions with the substances whose depolymerization they have assisted as fluxing materials.

A further aid in the degradation of reversible resin gels are peptizing agents, as they are well known in colloid chemistry. Peptizers are required only in small amounts. It is not necessary to make additions of them in the present case, because decomposition products acting as peptizers, are formed during the process and are not removed from the resin until degelling sets in. Such peptizing agents have the ability to penetrate into the gelled particles, to break them up into smaller units, and to disperse them within the liquid portion of the surrounding medium.

The above considerations illustrate the nature of the resin material treated in accordance with the present invention but certain factors of manufacturing procedure are important in carrying out the production of the copal-like resinous esters of the present invention. The building up of large molecular aggregates and subsequently breaking them down again into smaller units, requires special equipment and machinery. The heating equipment must be suitable to put in large amounts of heat, within short periods of time, and within high temperature ranges, and a very efficient cooling system must be at hand in order to carry the kettle temperature quickly down below the region of gelation. The period of gelation is hazardous because, within this time and temperature area, reversible gels might convert into irreversible gels if held too long at gelation temperature with the result that agitation stops and a fire starts. The stirring equipment requires a powerful motor to keep the agitator moving, while the heated resin is in the process of gelatinizing. Thorough mechanical mixing is of the greatest importance at this stage of the process in order to equalize the temperature within the kettle to avoid decomposition, partial overpolymerization, and possible charring or even burning. Strong foam breakers are necessary to handle the heavy foaming which accompanies the processing. The maximum temperature to be reached depends upon the temperature at which the particular resinous ester gelatinizes, and generally should be from 20 to 40° C. higher than the gelation temperature. As a general rule with the majority of materials treated in accordance with the present invention, the peak temperature reached during the processing varies between 270° and 325° C., or more particularly 290° to 325° C., the temperature being stated approximately. So that in carrying out the treatment cycle, it is desirable to carry the heating and cooling through the region of gelation as rapidly as possible from just below the gelation temperature to the maximum temperature reached and return from such maximum temperature to just below the gelation temperature under the conditions of agitation and rapid heating as set forth above, depending to some extent on the nature of the materials being treated, the products to be obtained, and the equipment available.

In the early stages of the process of depolymerization, pressure may be applied and the heating carried out under such pressure to keep acid decomposition products which act as peptizing and dispersing agents within the kettle. As soon as dispersion is sufficiently advanced, as evidenced for example, by a decreasing viscosity of the kettle content after the maximum viscosity has been reached, the pressure is released. Finally vacuum may be applied to remove volatile matter present.

When the finished products are unloaded from the kettle, a decided copal-like odor as obtained during Congo copal running is often noticed, obviously an odor produced by the degradation of highly polymerized material. As in copal running, the depolymerization process in the manufacture of copal-type synthetics is accompanied by a considerable loss of weight.

A typical case, explaining the new principles of producing copal-like synthetic resins is demonstrated in the graph shown in the drawing. It refers to the production of a bis phenol resin as described later on in Example 2, and illustrates the change of molecular weight and viscosity during the time of processing. To picture the interesting phase of gelation, the resin viscosity in the chart is expressed in two different ways, first in terms of the Gardner scale for a solution of 60 parts of resin in 40 parts of xylol, second in terms of amperes showing the relative electrical energy necessary to turn the agitator of the resin kettle.

It will be seen that the change of viscosity of the resin, measured in solution, surpasses the scale of the graph during the gelation period, however, it is clearly pictured by the change in the resistance, which the resin offers to agitation, while processed in the kettle. It reaches a high point at about 27 hours. At the same time, the molecular weight has reached a maximum, growing slowly during the upward movement of the viscosity and decreasing again slowly during its downward trend. A temperature of 275° is reached after 24 hours, the high point of 305° is reached after 27 hours, and the kettle temperature is lowered down to 275° again after about 30 hours. The temperature and time limits given are typical for the process under this invention. Gelation and degelling proceeds above the temperature of 270° and under 325°, within about 4–10 hours.

The formation of copal-like esters in accordance with the present invention involving polymerization first, following by degradation afterwards, results in products which present a striking similarity in properties of the new copal-like synthetic resins which closely approach many of the characteristics of the fused natural copals.

The resins of this invention have outstanding solubility both in volatile solvents and oils. Embracing other resin groups into a comparison of the degree of solubility, the outstanding position of the new resins becomes even more apparent. Hard and viscous modified phenolic resins have very limited solubility in kerosene, whereas typical resins of the new class are completely soluble in this solvent. Most phenolics give clear solutions in bodied oils only at temperatures above 270°, whereas the new resins dissolve in oil at temperatures that are 100° lower.

The new resins, furthermore, possess outstanding heat stability with the result that during the treatment in the varnish kettle they suffer a heat loss which is only a fraction of the loss undergone by other synthetic resins. To cite exact figures an orthodox resin may lose 2%, as compared to ½% loss for the resins under this invention, all conditions being equal.

Due to their process of manufacturing, the new resins possess a high degree of molecular homogeneity. The outstanding internal homogeneity produces mechanical toughness in the resins and also is the reasons for the lack of false body. The new resins exhibit genuine viscosity which is not decreased by the heat of varnish cooking, quite in contrast to the false body observed in many high viscosity resins, which are made by polymerization only. Resins with false body are physical mixtures of several portions of various degrees of polymerization. The actual measured viscosity of such resins is the arithmetical mean of the low viscosity portions and the portions of high viscosity. A part of the latter may be overpolymerized even to a highly gelatinous condition. On further heating of such a resin, either alone or with oil, its gelatinous portion is degelled and liquefied to a more or less fluid state. Thereby the total or average viscosity of the resin as determined by the usual method, is decreased, offering the typical picture of false body. The new resins produced in accordance with the present invention do not show this peculiar phenomenon because due to their mode of preparation, they are polymerized uniformly throughout, and cannot contain any overpolymerized portions which are liable to degelling.

Due to the fact that the new resins contain free hydroxyl groups they possess high reactivity with fatty acids, a property which is of great practical importance for the varnish maker. Fatty acids are present or formed during the varnish cooking process, especially using soft and slow bodying oils, such as soya oil, linseed oil, and also dehydrated castor oil. Under the same circumstances also fatty carboxyl groups of partially split oils are formed which act like fatty acids. The free hydroxyl groups of the resins under this invention are able to esterify such acidic substances, thereby producing the linkage of resin and oil. In order to demonstrate this type of resin oil reaction, a representative type of the new resin group produced under the present invention, having an acid value of 5 was heated for 2 hours at 260° C. with the same amount of linseed oil fatty acid of an acidity of 185. If no reaction took place, the melt would show an acid value of 95, whereas the actual determination shows an acid value of only 50, thereby giving evidence of an avid reaction which has occurred between resin and fatty acids.

As a consequence of resin oil reactivity, the new resins show quick bodying and speedy drying with oils, especially with linseed oil. For the same reason, the varnish films are of outstanding gloss, mechanical toughness, rigidity and resistance quite comparable to those of fossil gum varnishes.

If solubilized fossil gums are incorporated into the new resin class, the resin characteristics of outstanding solubility, molecular homogeneity, mechanical toughness and heat stability become even more apparent.

To explain further the interesting new principles of producing copal-like synthetic resins, under the present invention, the case of a rosin modified maleic resin is given, containing unusually large amounts of maleic anhydride and glycerine, which are so high that gelation occurs unless the degradation procedure of this invention is applied. This resin is composed of 100 parts of gum rosin, 15.5 parts of maleic anhydride and 22.5 parts of glycerine.

The following tabulation registers acid values, melting points, viscosities, and solubilities of samples taken from a production batch after different times of processing and at various batch temperatures. The viscosity is expressed by way of the Gardner scale as that of a 60% resin solution in xylol. The solubility is given as a number of cc. in titrating to cloud point 10 grams of a 60% resin solution in xylol with mineral spirits. It is also given as the temperature at which a clear solution is obtained, when the resin is heated up with two parts of Z body linseed oil.

| Temperature of batch | Time of Processing | Acid value | Melting point | Viscosity | Solubility | | Condition of batch |
| --- | --- | --- | --- | --- | --- | --- | --- |
| | | | | | Titration | Clearing temperature | |
| Degrees | Hours | | Degrees | | Cc. | Degrees | |
| 240 | 10 | 30 | 142 | O | 20 | 260 | Liquid. |
| 260 | 18 | 28 | 145 | U | 15 | 270 | Do. |
| 280 | 25 | 26 | 155 | Z | 12 | 290 | Incipient gelation. |
| 310 | 30 | 19 | 150 | X | 18 | 240 | Slightly gelatinous. |
| 280 | 34 | 18 | 145 | U | 24 | 190 | Liquid. |

It will be seen that the peak of gelation process in the particular case given is reached between 24 and 30 hours of treatment, when the melting point is at its highest and solubility is at its lowest level.

The above tabulation serves well to define the character of the new material, particularly by comparing the sample taken after 18 hours of treatment with the sample taken after 33 hours of treatment, the first one representing the old type of resin, the second one being the new type of material. Both samples are taken from a liquid batch, both have the same melting point, the same viscosity, and outwardly look exactly alike. However due to the fact that the material of the second sample has passed through the process of gelation and degelling, it has acquired entirely different properties.

Its solubility is greatly improved both in volatile solvents and oil. Expressed in cc. of mineral spirits titration it has increased 60% in volatile solvents. In drying oil it has improved to the extent that the point of clarification in bodied linseed oil drops from 270° to 190°. Normally solubility is directly proportional to melting point for viscosity for the same resin group. The process of the invention makes it possible to vastly increase solubility without decreasing melting point or viscosity, which is a great technical advantage.

The internal structure of the second sample is basically different from that of the first sample. The resin before the treatment of this invention does not give complete solutions even in the strong solvents, but segregates insoluble or swelling particles, which can be separated from the bulk of the solution by titration. After the resin has passed through the degelling process, it dissolves completely even in weak solvents, indicating the absence of any overpolymerized parts. The fact that in spite of this the viscosity of the two samples is alike, proves that low-molecular portions have increased, leading to a higher degree of molecular homogeneity.

The process of the invention also produces resins of higher bodying speeds, as can be proved by comparing the two resin samples in question. For this purpose, one part of the resin is heated up with two parts of Z bodied linseed oil to 300° C., and held there until a viscosity of H is reached, when a sample is thinned with an equal amount of mineral spirits. The time necessary to attain this viscosity is the bodying time: it amounts to 100 minutes for the untreated material and to only 70 minutes for the new resin. The reason for the increased bodying time is mainly due to the fact that no time is lost for degelling of the treated resin, whereas the old material requires considerable time for destroying the false body of its overpolymerized parts.

When two samples, taken after 18 and 33 hours respectively, are compared for heat stability, a substantial difference appears which is of great economical importance, because heat losses increase the material costs. The determination is carried out simply by heating 300 grams of the samples in a 600 cc. beaker up to 285° C., holding it at this temperature for 2 hours, and then determining the loss in weight. The first sample loses 4%, the second sample only ½% in weight, proving an eight fold increase in heat stability.

The following examples serve to further explain, the essential features of the invention and to illustrate them, the parts being by weight unless otherwise indicated.

*Example 1.*—100 parts of wood rosin are fused with 15 parts of masticated Congo copal. To the clear melt is added, at 180°, an amount of 25 parts of a condensate made by alkaline condensation of one mol para tertiary butyl phenol and two mols formaldehyde in the usual procedure. After the phenol component is absorbed, 15 parts of glycerine are added. This addition includes an excess of several per cent of glycerine over the amount necessary to neutralize the rosin and copal component. The excess is required to supply the free hydroxyl groups, which prevent a solidification of the batch and make the degradation process technically possible. For esterification the batch is heated to 275°, then heated quickly to 310° and cooled down quickly again, taking care that the treated resin passes through the temperature range of 280–310° both ways in less than 3 hours. Agitation is applied all the time and vacuum is used on the cooling part of the treatment.

In this way a resin is obtained which possesses high bodying and drying speed, and which in surface coatings develops a toughness and rigidity, similar to that of fossil gums.

*Example 2.*—100 parts of gum rosin are heated to 160° C. and, while the resin is actively agitated, 22 parts of a bis phenol-formaldehyde condensate is added slowly. The condensate is produced in the usual way by combining under the influence of an alkaline catalyst equal weights of bis phenol and 37% formaldehyde. After the condensate is dissolved in the rosin, the temperature is raised to 200° and 13.5 parts of glycerine are added, which is considerably more than necessary to simply neutralize the rosin compound, but necessary to prevent solidification of the resinous mass. While the batch is heated up esterification occurs and is practically completed at 275°, a temperature which is reached after about 24 hours. From this point on, with continued agitation, the temperature is quickly raised in 2–3 hours to 305° and cooled rapidly again in 2–3 hours to 275°, thereby passing through the period of gelation and degelling within a total time limit of 4–6 hours. When on the downheat 275° is reached, vacuum is applied until the temperature has dropped to 250° and the kettle is unloaded. The changes in the viscosity and the molecular weight of the resin in this particular case is pictured in the drawing given in the specification.

The phenolic resin, described in Example 2 is distinguished by an unusually high degree of solubility, molecular homogeneity, oil reactivity, and yields surface coatings with improved characteristics of drying speed, gloss, hardness and resistance.

*Example 3.*—100 parts of polymerized rosin and 5 parts of fumaric acid are heated to 220° and, while the batch is agitated, an amount of 30 parts of an amyl phenol condensate is added slowly in the usual procedure. The condensate is prepared by alkaline condensation of one mol para tertiary amyl phenol and two mols formaldehyde. After the phenol-formaldehyde syrup is completely absorbed at about 220° C., 15 parts of pentaerythritol are stirred in, the batch is slowly heated to 270° C., and held at this temperature for esterification. When esterification is completed, the temperature is quickly increased to 300°, with powerful agitation continuously maintained. As soon as a decrease in viscosity is noticeable, the batch is cooled to 270° and held there under vacuum until all volatile matter is removed.

The final resin has the heat stability of a fused copal, with no further heat loss on cooking in the varnish kettle. It is outstanding by its oil reactivity, yielding genuine viscosity with no indication of false body.

In the foregoing examples reversible gels are produced which in the course of the process are degelled again. It can be stated generally that reversible gels, suitable for the purpose of my invention, referred to the quantity of rosin present, should desirably contain for the results herein set forth:

(1) Not less than 25% and not more than 35% alkyl phenol condensate such condensate being obtained by reaction of not less than 2 mol formaldehyde on one mol of alkyl phenol, or
(2) Not less than 20% and not more than 30% bis phenol condensate, such condensate being obtained by reaction of not less than 3 mol formaldehyde on one mol of bis phenol, and
(3) Not less than 12% and not more than 20% glycerine or pentaerythritol.

Reversible gel resins of the character set forth above in the present case may be further modified by the inclusion of up to 5% of maleic anhydride, maleic-, fumaric-, or malic acid as reactants as illustrated in the examples set forth above. The resulting resin produced from rosin, polyhydric alcohol, maleic or fumaric acid or anhydride, and phenol formaldehyde reactant, should be a reversible gel resin of the type referred to above capable of being depolymerized by the method set forth herein.

This application is a continuation in part of application Serial No. 666,438, filed May 1, 1946, now U. S. Patent 2,471,629.

Having thus set forth my invention, I claim:

1. The method of preparing copal-like resinous esters which comprises depolymerizing a reversible gel resin of a rosin acid-polyhydric alcohol ester containing free hydroxyl groups, the polyhydric alcohol being selected from the group consisting of glycerine and the pentaerythritols, said rosin acid-polyhydric alcohol ester being modified by reaction with a phenol-formaldehyde condensate and said reversible gel resin being free from fat acid esters the amount of phenol-formaldehyde condensate being not less than 20% and not more than 35% on the quantity of rosin present, and the polyhydric alcohol being not less than 12% and not more than 20% on the quantity of rosin present, by heat treatment from just below gelation temperature to the maximum temperature used and from said maximum temperature back to just below gelation temperature, all in a time period of from 4 to 10 hours within the temperature range of 270 to 325° C. with agitation to equalize the temperature in the mass but without mastication, during which heat treatment the resinous ester first gels and then degels and passes through its maximum viscosity to produce a depolymerized copal-like resinous ester.

2. A depolymerized resin resulting from the method of claim 1, the depolymerized product having a higher solubility in oils and volatile solvents, molecular homogeneity, mechanical toughness, and heat stability than a polymerized resin of the same chemical composition, melting point and viscosity which has not been depolymerized by the method of claim 1.

3. The method of claim 1 in which the heating is carried out under pressure until a decrease in viscosity is noted.

4. The method of claim 1 in which the heating is carried out under pressure until a decrease in viscosity is noted followed by application of vacuum to eliminate volatile matter.

5. The method of claim 1 in which the reversible gel resin is modified by reaction with an acid selected from the group consisting of maleic and fumaric.

6. The method of claim 1 in which the phenol formaldehyde resin is a tertiary alkyl phenol formaldehyde condensate, and the reversible gel resin is produced from, based on the weight of rosin present, (a) not less than 25% and not more than 35% of the tertiary alkyl phenol formaldehyde condensate which condensate is obtained from not less than 2 mols formaldehyde and 1 mol of alkyl phenol, (b) not less than 12% and not more than 20% of the stated polyhydric alcohol.

7. A depolymerized resin resulting from the method of claim 6.

8. The method of claim 6 in which the reversible gel resin is modified by reaction with an acid selected from the group consisting of maleic and fumaric.

9. The method of claim 1 in which the phenol formaldehyde condensate is a tertiary butyl phenol formaldehyde condensate.

10. A depolymerized resin resulting from the method of claim 9.

11. The method of claim 9 in which the reversible gel resin is modified by reaction with an acid selected from the group consisting of maleic and fumaric.

12. The method of claim 1 in which the phenol formaldehyde condensate is a tertiary amyl phenyl formaldehyde condensate.

13. A depolymerized resin resulting from the method of claim 12.

14. The method of claim 12 in wihch the reversible resin is modified by reaction with an acid selected from the group consisting of maleic and fumaric.

15. The method of claim 1 in which the phenol formaldehyde condensate is a bis-phenol formaldehyde condensate and the reversible gel resin is produced from, based on the weight of rosin present (a) not less than 20% and not more than 30% of the bis-phenol formaldehyde condensate which condensate is obtained from not less than 3 mols formaldehyde on 1 mol of bis-phenol and (b) not less than 12% and not more than 20% of the stated polyhydric alcohol.

16. A depolymerized resin resulting from the method of claim 15.

17. The method of claim 15 in which the reversible gel resin is modified by reaction with an acid selected from the group consisting of maleic and fumaric.

18. The method which comprises depolymerizing a reversible gel resin of a rosin acid-polyhydric alcohol ester containing free hydroxyl groups, the polyhydric alcohol being selected from the group consisting of glycerine and the pentaerythriotols, which ester has been given the ability of gelling by reaction with a phenol formaldehyde resin, by heat treatment from just below gelation temperature to the maximum temperature used and from said maximum temperature back to just below gelation temperature, with agitation to equalize the temperature in the mass but without mastication, all in a time period and temperature range at from 275 to 325° C. in from 4 to 10 hours.

WILLIAM KRUMBHAAR.

No references cited.